United States Patent [19]

Niemann

[11] Patent Number: 5,598,329
[45] Date of Patent: Jan. 28, 1997

[54] METHOD AND DEVICE FOR CONTROLLING A PROCESS

[75] Inventor: Martin Niemann, Erlangen, Germany

[73] Assignee: Siemens Aktiengesellschaft, Munich, Germany

[21] Appl. No.: 373,819

[22] Filed: Jan. 17, 1995

[30] Foreign Application Priority Data

Jan. 17, 1994 [EP] European Pat. Off. ............... 94100589

[51] Int. Cl.$^6$ .................................................. G05B 13/04
[52] U.S. Cl. ............................................ 364/150; 364/151
[58] Field of Search .................................... 364/150, 148, 364/149, 151

[56] References Cited

FOREIGN PATENT DOCUMENTS 0519501  12/1992  European Pat. Off. .
0521749  1/1993  European Pat. Off. .

OTHER PUBLICATIONS

Proceedings of the 1992 International Symposium on intelligent control 11 Aug. 1992 Glasgow, GB, pp. 122–127; D. Sbarbaro–Hofer et al.: Neural Control of a Steel Rolling Mill.

Fuzzy Sets and Systems, vol. 56, No. 3, Jun. 1993, Amsterdam, NL, pp. 273–280; M. Balazinski et al.: Modelling of Neural Controllers with Application to the Control of a Machining process.

Automatisierungstechnische Praxis— ATP, vol. 34, No. 11, Nov. 1992, München, DE, pp. 640–645; D. Neumerkel et al.: *Anwendungsstand Künstlicher Neuronaler Netze in der Automatisierungstechnik.*

Mechatronics, vol. 3, No. 6, Dec. 1993, Oxford, GB, pp. 705–725; T. H. Lee et al.: *Real–Time Parallel Adaptive Neural Network Control for Nonlinear Servomechanisms— An Approach Using Direct Adaptive Techniques.*

Second IEEE International Conference of Fuzzy Systems, 28 Mar. 1993, San Francisco, US, pp. 345–350; H. Bersini et al.: A Simple Direct Adaptive Fuzzy Controller Derived From its Neural Equivalent.

Primary Examiner—Paul P. Gordon
Assistant Examiner—Karen D. Presley
Attorney, Agent, or Firm—Kenyon & Kenyon

[57] ABSTRACT

To guide a process whose output variable (c) depends on a plurality of influential variables (v, a, h, $\alpha$) acting on the process, the process is controlled by a controlling variable (p*) in such manner that the output variable (c) assumes the value of a guiding variable (c*). Correcting variable (p*) is calculated from guiding variable (c*) on the basis of a model of the process, with the model being adjusted on the basis of a comparison of the results ($c_M$) supplied by the model with measured variables (c, v, h, a) of the process to the process event.

11 Claims, 5 Drawing Sheets

METHOD AND DEVICE FOR CONTROLLING A PROCESS

BACKGROUND OF THE INVENTION

The present invention relates generally to methods and devices for controlling processes, and more particularly to a method and device for controlling a process, in which an output variable, which depends on several influential variables acting on the process, is influenced by a correcting variable through a correcting element acting on the process in such fashion that it assumes the value of a predetermined controlling variable.

It is generally known that a process can be controlled in such fashion that the output variable of the process, in other words the regulated variable, is compared with a controlled variable and the regulating difference thus obtained is supplied to a regulating device, which generates a correcting variable at the output, with which the process is influenced by a correcting element. In addition to the correcting variable, a number of other influential variables also act on the process, with the relationship between the correcting variable and the influential variables on the one hand and the output variable of the process on the other hand being represented by graphs obtained by measuring the variables. These graphs, which in practice are almost always nonlinear, are usually not known exactly, however, and can change as the result of varying process conditions. This leads to the problem of adjusting the regulation of the process to changing process conditions to ensure that the regulating device always operates at the optimum working point.

The present invention is therefore directed to the problem of developing a method and a device for controlling a process in which the control is adjusted optimally to the actual process event, despite changing process conditions.

SUMMARY OF THE INVENTION

The present invention solves this problem by: (a) calculating a model output value by means of a model of the process contained in a computing device as a function of the correcting variable supplied to the input of the model and the influential variables and also as a function of variable model parameters; (b) comparing the model output value with the measured output variable of the process, changing the model parameters depending on the results of the comparison and reducing the difference between the model output value and the output variable of the process; and (c) using the model of the process thus adapted to the actual process event to determine the correcting variable acting on the process through the correcting element as a function of the guiding variable and the influential variables.

Accordingly, in a device implementing the method of the present invention, a model of the process is contained in a computing device, which model calculates a model output value as a function of the correcting variable supplied to it at the input and the influential parameters, and as a function of variable model parameters. In addition, a learning algorithm is implemented in the computing device, which algorithm, as a function of the difference between the model output value and the measured output variable of the process, changes the model parameters to reduce said difference. Finally, the computing device includes means for computational determination of the correcting variable on the basis of the model of the process acting on the process through the correcting element and as a function of the guiding variable and the influential variables.

The process to be guided therefore is simulated by the model, with the latter being adjusted to the actual process event by adaptation. The correcting variable is then calculated directly from the guiding variable, so that a regulating device is no longer required at all with sufficiently accurate simulation of the process by the model. Hence, the invention offers the possibility of controlling a process directly using the guiding variable without regulation, so that the process is guided more simply and rapidly than is the case with regulation.

The correcting variable can be determined in such fashion that the control variable and the influential variables are supplied to the input of an inverse model of the process that generates the correcting variable on the output side, with the inverse model also being adjusted to the process event depending on the adaptation of the model of the process. The inverse model of the process, in contrast to the non-inverse model, does not receive the correcting variable as an input variable, but calculates the correcting variable from the other variables in the opposite direction. Accordingly, the inverse model can be derived directly from the non-inverse model.

According to a preferred variation on the method according to the present invention, provision is made such that in order to determine the correcting variable, the guiding variable is compared with the model output value and a value supplied to the model for the correcting variable is changed depending on the results of the comparison until the model output value corresponds to the guiding variable, and the value finally obtained for the correcting variable is supplied to the correcting element. Thus, this advantageously eliminates the need for an inverse model of the process.

As has already been mentioned, with a sufficiently accurate simulation of the process to be guided by the model, a regulating device for regulating the process is no longer necessary. For the case in which regulation is nevertheless considered to be necessary, the difference in regulation between the model output value or the predetermined guiding variable and the measured output variable of the process is supplied to a regulating device, whose output signal is applied to the correcting variable generated by means of the model of the process. The computing device with the model of the process then acts as a pilot control for the regulating device, so that the latter is required only to control those regulating errors that are not detected by the model. The regulating device is therefore subjected to only slight demands and can therefore be made correspondingly simple.

In order to ensure that the regulating device always operates at the optimum working point, the amplification of the regulating device is advantageously adjusted by means of the model output value supplied by the model of the process.

The model of the process is generated in a learning process, with the model initially being learned on the basis of available knowledge about the process to be guided. The process is then controlled with this model or with the corresponding inverse model. The model can then be improved and adjusted to the actual process event on the basis of the measured values for the correcting variable, the influential variables, and the output variable of the process. Preferably the model output value is formed by a preferably additive-linking of a basic component and a correction component, with the basic component being produced by a basic model of the process that has been prepared on the basis of existing knowledge about the process and is adapted on the basis of the measured output variable of the process to the process event, with the correction component being generated by a correction device which is adjusted adaptively to the process event depending on the differences remaining between the model output value and the output variable of the process after adaptation of the basic model. Dividing the model of the process into a basic model and a correction device offers the advantage that a suitable means for controlling the process is available even after a relatively short learning time, namely after successful adaptation of the basic model. The process to be guided is therefore well simulated by the basic model derived from existing knowledge about the process and the current process event, but remaining model errors are not corrected by an attempt at a further adaptive adjustment of the model, but by the correction device connected in parallel with the basic model. In contrast to an exclusive use of a model for generating the model output value, this offers the advantage that both the construction and the training of the basic model and the correction device are simpler than in a single model intended to meet the same requirements.

The basic model of the process is preferably made in the form of a neural network, with a mathematical function being prepared to produce the basic model of the process on the basis of existing knowledge about the process, for example, in the form of curves that describe the relationship between the correcting variable, the influential variables, and the output variable of the process and are determined by measurements of these variables, said function showing the dependence of the output variable of the process on the correcting variable, the influential variables, and function parameters, and with the function thus obtained being in the form of a neural network to which the correcting variable and the influential variables are supplied on the input side and whose network parameters corresponding to the function parameters are adjusted adaptively to the process event. This ensures that from the outset, the structure of the neural network is adjusted to the process on the basis of existing knowledge about the process to be guided, namely the measured curves and the mathematical function derived from them, so that the neural network, in contrast to a general network, is simple in structure and can be adapted through its network parameters correspondingly simply and quickly to the actual process event.

Remaining model errors that result from the fact that the basic model or neural network, because of its simple structure, can be adapted only up to a certain limit to the process event, are corrected by the correction device, as already explained. The correction device is advantageously so designed that it prepares interpolation node-based correction values for predetermined interpolation nodes in the multidimensional space defined by the correcting variable and the influential variables; the interpolation node-based correction values are calculated from differences between the model output value and the output value of the process measured together with the values of the correcting variable and the influential variables located between the interpolation nodes; the respective measured difference occurs again during interpolation of the interpolation node-based correction values; and the correction component is calculated by interpolation between those interpolation node-based correction values whose interpolation nodes are adjacent to the values for the correcting variable belonging to the correction component and for the influential variables. On the basis of measured model errors, therefore, correction values are initially learned only at a limited number of predetermined interpolation nodes, so that the structure of the correction device can be made correspondingly simple and learning of the correction values at the few interpolation nodes takes place simply and quickly. The correction component is then calculated in a simple fashion for any value combination of the correcting variable and the influential variables that appear, by interpolation between the learned interpolation node-based correction values.

In this way, interpolation for calculating the correction components preferably proceeds using fuzzy logic, with each interpolation node being assigned a membership function that has a value of one at the interpolation node in question and drops to zero by the closest interpolation node, and with the interpolation node-related correction values being weighted with the corresponding membership functions and superimposed on one another.

Like the basic components, the correction components are preferably calculated in a neural network that forms the correction device.

The method according to the invention is used in particular in industrial processes that can be described by models based on existing knowledge about the respective process, obtained for example by measuring process variables. In this connection, the method according to the invention can be used in a preferred application, wherein the zinc layer thickness of a strip passing through a bath of liquid zinc is regulated, with air being blown from a nozzle against the strip as it emerges from the zinc bath, with the zinc layer thickness being the starting variable of the process, the air pressure being the correcting variable, and the strip speed and geometric arrangement of the nozzle relative to the strip being the influential variables that affect the process.

According to the embodiments of the method of the present invention described above, the device for guiding the process has corresponding means designed for working the method of the invention, i.e. in particular a suitably programmed computing device.

DETAILED DESCRIPTION

Figure 1:
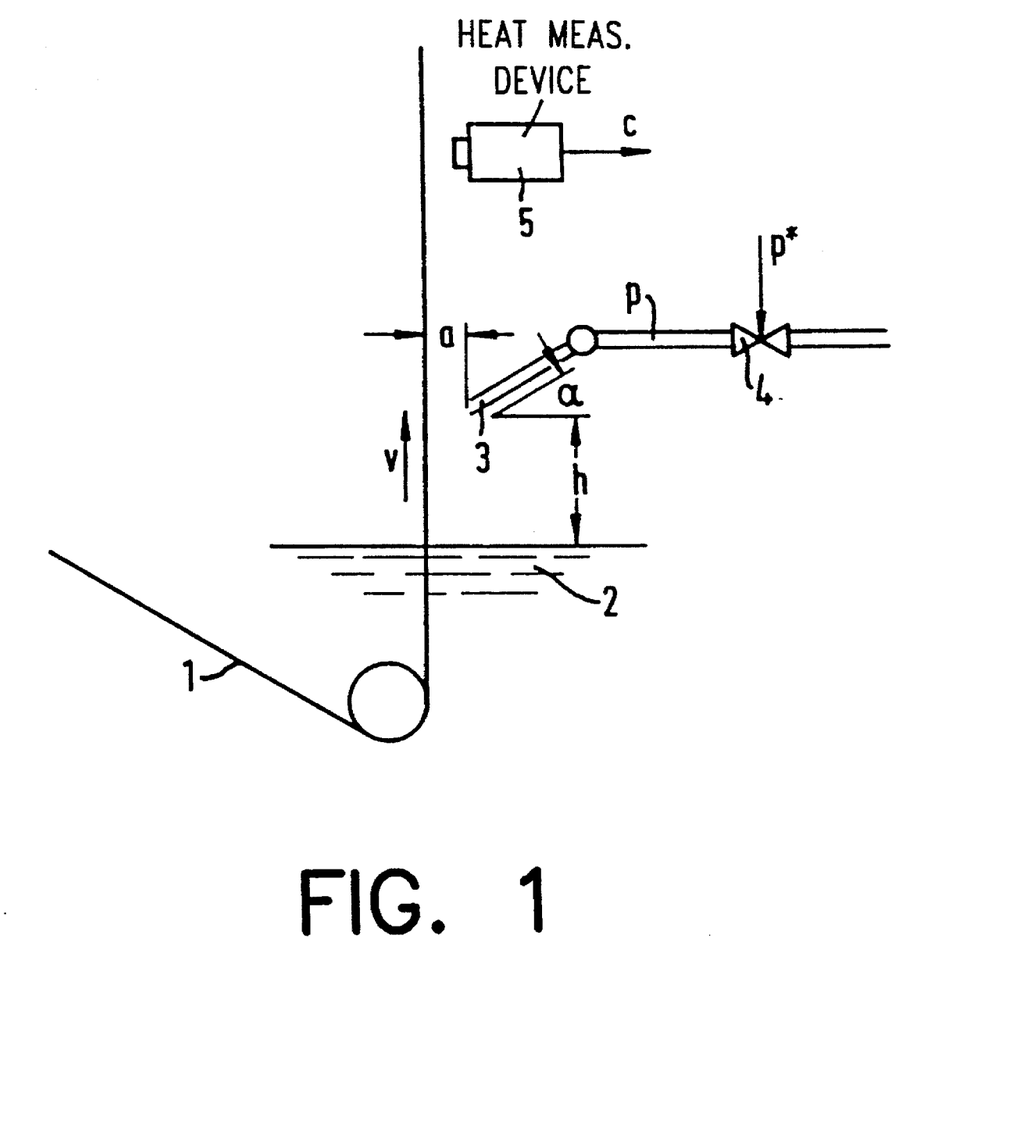
FIG. 1 is a diagram of a hot-dip galvanizing plant.

FIG. 1 shows a diagram of a hot-dip galvanizing plant in which a rolled strip 1 travels at a speed v through a bath 2 containing liquid zinc. After emerging from zinc bath 2, strip 1 has a zinc layer adhering to it which is still liquid. A nozzle 3 is provided at a distance 'a' from strip 1, from which nozzle air emerges at a pressure p against strip 1 and thus removes excess zinc. Air pressure p is adjusted by an adjusting element 4, a valve in this case, as a function of a correcting variable p*. Beyond nozzle 3 a heat-measuring device 5 is provided along the path of strip 1 to measure the zinc layer thickness c on strip 1.

The principal factors that influence zinc layer thickness c are speed v of strip 1, air pressure p, distance 'a' between strip 1 and nozzle 3, height h of nozzle 3 above zinc bath 2, and angle $\alpha$ between strip 1 and nozzle 3.

Figure 2:
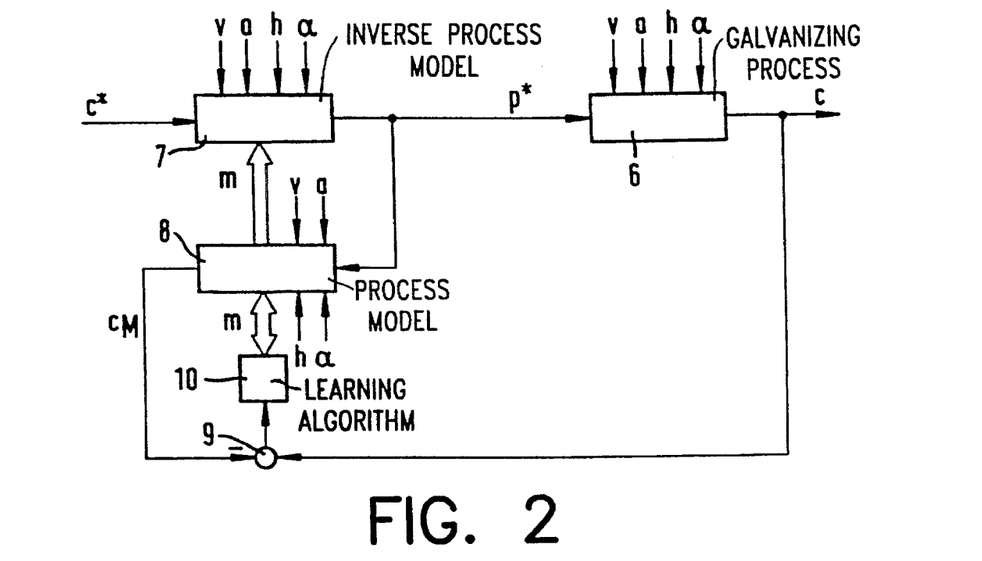
FIG. 2 is a block diagram of a first embodiment of the device according to the present invention for guiding a process.

The industrial process shown in FIG. 1, in which the starting variable of the process, namely zinc layer thickness c, changes as a function of correcting variable p* and the other influential variables v, a, h, and $\alpha$, is shown in FIG. 2 in a block circuit diagram in the form of a function block 6. The goal is to adjust correcting variable p* so that starting variable c of the process, in other words the actual measured zinc layer thickness, assumes the value of a controlled variable c*, in this case the required zinc layer thickness. Correcting variable p*, in contrast to conventional regulation, is therefore adjusted by an inverse model 7 of process 6, which uses guiding variable c* and the influential variables v, a, h and $\alpha$ as input variables and calculates correcting variable p* directly from these variables. Inverse model 7 is derived directly from a model 8 of process 6 that simulates process 6, and accordingly, like the process, uses correcting variable p* and influential variables v, a, h, and $\alpha$ as input variables. These input variables are linked in model 8 through variable model parameters m to a model output value $c_M$, which resembles actual output variable c of process 6 more closely as process 6 is simulated more exactly by model 8. For this purpose, model 8, which has already been preadapted on the basis of already existing knowledge about process 6, is adaptively adjusted to the actual process event after startup of the entire device for guiding process 6. For this purpose, model output value $c_M$ is compared in a comparison device 9 with measured output variable c of process 6 and difference $c_M$–c is supplied to a learning algorithm represented by circuit block 10, said algorithm accessing model parameters m in model 8 and changing them as a function of the difference $c_M$–c found to reduce this difference. At the same time, in inverse model 7 as well, which in contrast to model 8 performs only in inverse calculation and for this reason is derived directly from model 7 and also has the same model parameter m changes as well so that model 8 and corresponding inverse model 7 are both adapted to the actual process event.

When model 8 is well adapted to process 6, correcting variable p* is calculated from inverse model 7 as a function of guiding variable c* and influential variables v, a, h, and $\alpha$ so exactly that output variable c of the process assumes the value of guiding variable c*. Then correcting variable p* is calculated more rapidly than is the case with conventional regulation, which must be adjusted constantly to the actual process event.

Figure 3:
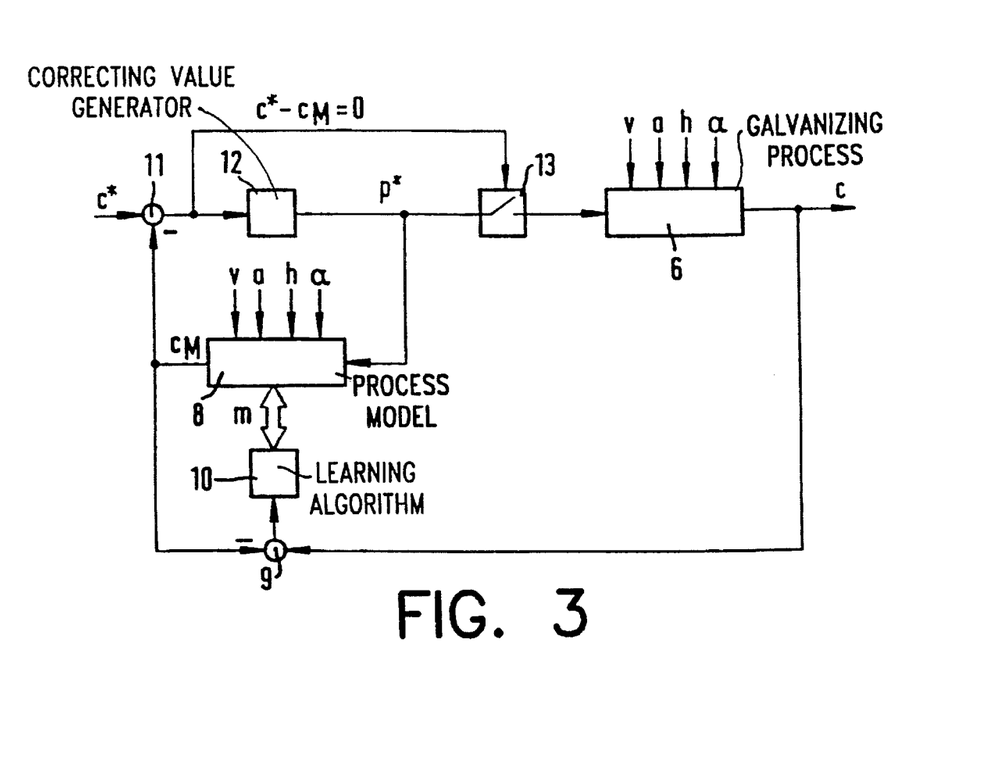
FIG. 3 is a block diagram of a second embodiment of the device according to the present invention.

FIG. 3 shows an alternative embodiment of the device according to the present invention for controlling process 6. This embodiment differs from that in FIG. 2 in that it lacks an inverse model 7. Instead, model output value $c_M$ is compared in another comparison device 11 with guiding variable c* and the result of the comparison c*–$c_M$ is supplied to a device 12 that generates a value for correcting variable p* on the output side and changes this value until the result of comparison c*–$c_M$ becomes zero. Since the value of correcting variable p* that is generated and changed by device 12 is supplied to model 8, output value $c_M$ of the latter changes until it has the same value as guiding variable c*. When this is the case, depending on comparison result c*–$c_M$=0, the current value of correcting variable p* is switched through by a switching device 13 to correcting element 4 (FIG. 1).

Figure 4:
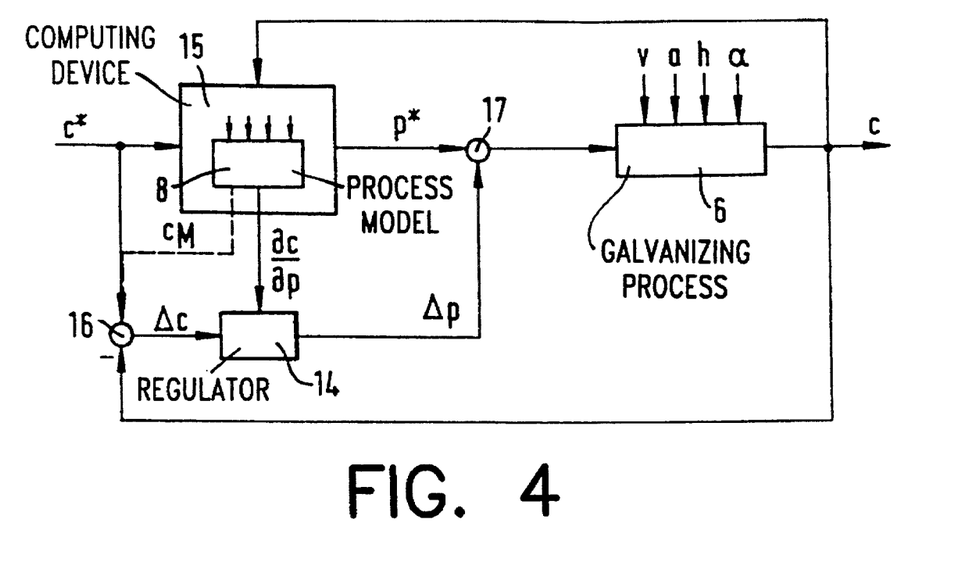
FIG. 4 is a block diagram of the device according to the present invention, with a regulating device added.

As already mentioned, in the embodiments of the device according to the invention shown in FIGS. 2 and 3, when the adaptation of model 8 to the process event is sufficiently accurate, exact guidance of process 6 is achieved without a regulating device being required. If the simulation of process 6 by model 8 is considered to be insufficiently accurate, a regulating device 14 can be provided in addition, as FIG. 4 shows. In FIG. 4, reference numeral 15 designates a computing device in which circuit blocks 7 to 13 shown in FIGS. 2 and 3 are implemented. Regulating device 14 is supplied on the input side with regulating difference $\Delta c$ formed in an additional comparison device 16, between guiding variable c* or, as indicated by the dashed line, model output value $c_M$ and output variable c of the process. Output signal $\Delta p$ of regulating device 14 is applied via an addition element 17 to correcting variable p*. Computing device 15 with model 8 therefore forms a pilot control for regulating device 14. Regulating device 14 is therefore required only to compensate for those regulating errors that are not detected by model 8, so that regulating device 14 is subjected only to slight demands and can be made correspondingly simple. In order to ensure that regulating device 14 operates when adjusted to the actual process event always at the optimum working point, amplification $\partial c/\partial p$ of regulating device 14 is adjusted by means of the changes in variables $c_M$ and p* processed by model 8.

In the following, the structure of model 8 and the learning process for adjustment of model 8 to the process event will be described in greater detail. In order to simplify the presentation, only the influence of strip speed v and air pressure p on zinc layer thickness c will be considered.

Figure 5:
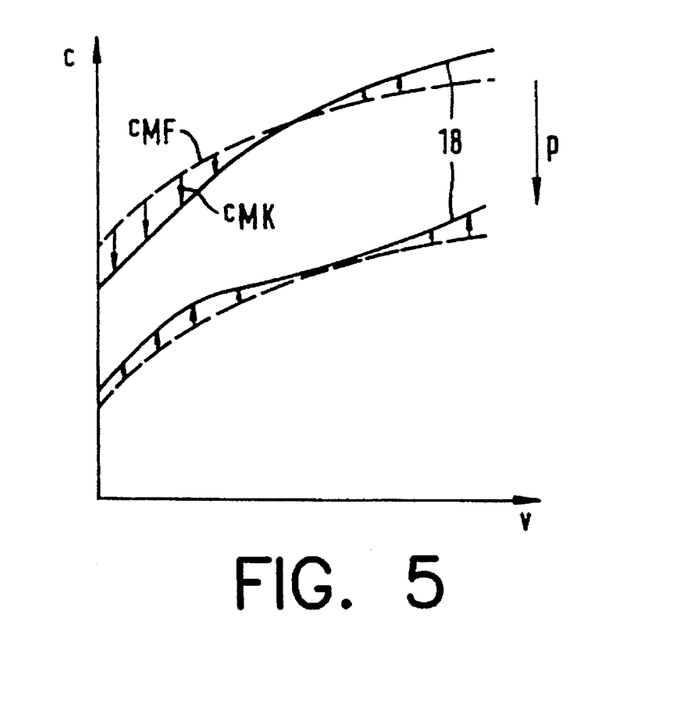
FIG. 5 is a diagram with curves describing the dependence of the starting variable of the process on influential variables.
Figure 6:
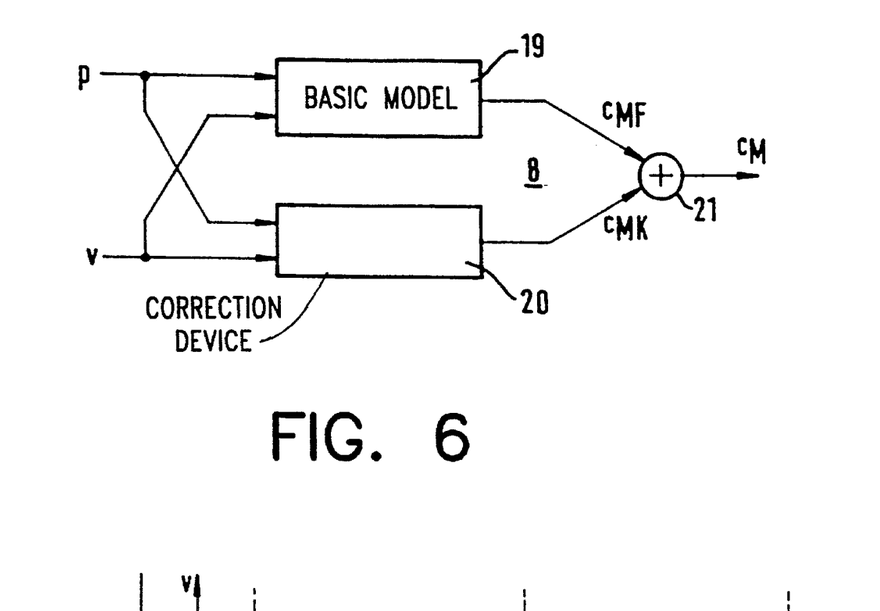
FIG. 6 is a block diagram of a model of the process consisting of a basic model and a correction device.

FIG. 5 shows nonlinear curves 18 for zinc layer thickness c as a function of strip speed v and air pressure p. These curves are simulated by model 8 of the process. As FIG. 6 shows, model 8 consists of a basic model 19 and a correction device 20 parallel thereto, to which input variables p and v are supplied. Basic model 19 calculates a basic component $C_{MF}$ from this and correction device 20 calculates a correction component $c_{MK}$, with both linked in an addition element 21 to model output value $c_M$.

Basic component $c_{MF}$ represents a functional approximation based on existing knowledge about the process. This knowledge consists of measurement data describing the relationship between zinc layer thickness c and influential variables p, v, a, h, and $\alpha$ acting on it, and obtained by measurements on a selected hot-dip galvanizing plant. From the graphic representation of the measurement data that corresponds to the pattern of curves 18 in FIG. 5, a mathematical function $c_{MF}$=f (p, V, h, $\alpha$) is derived that approximately represents the theoretical curves 18. If a, h, and $\alpha$ are constant, curves 18 can be approximated for example by the function $$C_{MF} = f(p,v) = \frac{v}{(K1 \cdot v + K2 \cdot p^{3/2} + K3)}$$

K1, K2 and K3 are functional parameters to be learned.

Figure 7:
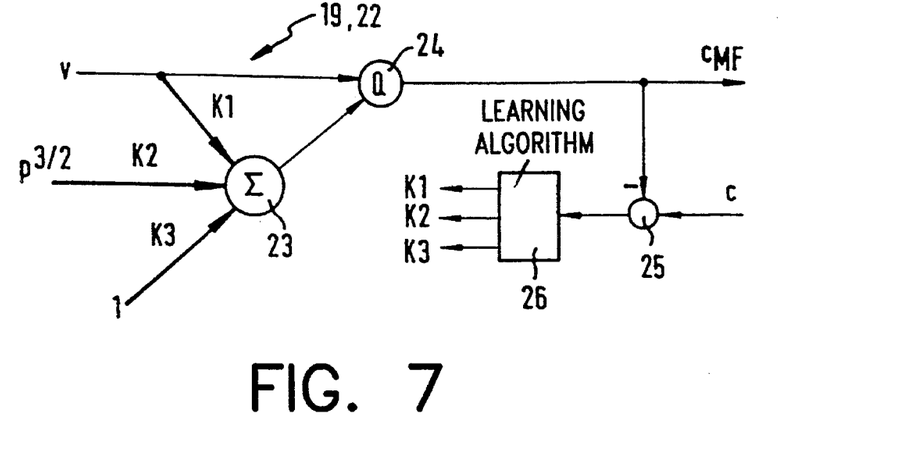
FIG. 7 is an example of the basic model designed as a neural network.

Mathematical function $c_{MF}$=f (p, v) thus obtained is in the form of a neural network 22, shown in FIG. 7. Variables v and $p^{3/2}$ are supplied on the input side to neural network 22 and are linked by a summation node 23 and a node 24 with a quotient function in accordance with the mathematical function given above. The connections of the nodes in neural network 22 are each provided with a factor. If the link appears as a solid line, the factor is learnable (network parameters K1, K2, K3); otherwise the factor is constant (here 1.0). Basic component $c_{MF}$ appears at the output of neural network 22.

In order to learn network parameters K1, K2, and K3, generated basic component $c_{MF}$ is compared with output variable c, generated and measured in process 6 as a function of measured variables p and v, in a comparison device 25. Depending on the results of the comparison, network parameters K1, K2, and K3 are changed in a learning algorithm 26 until the match between basic component $c_{MF}$ and output variable c of process 6 cannot be improved further.

Basic component $c_{MF}$ generated by a basic model 19 adapted in this fashion is indicated by dashed lines in FIG. 5. As can be seen, there are still differences between output variable c of process 6 and basic component $c_{MF}$ provided by basic model 19. Correction component $c_{MK}$ serves for reducing these differences, whose calculation in correction device 20 is explained in greater detail with reference to FIG. 8. First of all, interpolation nodes are defined in the multidimensional space defined by variables p, v, a, h, and $\alpha$ acting on the process. For simplification, as before, only variables p and v will be considered here, with the interpolation nodes ($P_i$, $v_j$) now correction values $c_{MKij}$ are learned, with difference $\Delta c_M$ between output variable c generated as a function of measured variables p and v by process 6 and basic component $c_{MF}$ supplied by basic model 19 for calculating the interpolation node-based correction values $c_{MKij}$ being used. In other words, the interpolation node-based correction values $c_{MKij}$ are calculated from differential value $\Delta c_M$ in such fashion that differential value $\Delta c_M$ is obtained inversely, with interpolation of correction values $c_{MKKij}$ at interpolation nodes ($P_i$, $v_j$) for current input variables p and v.

Figure 8:
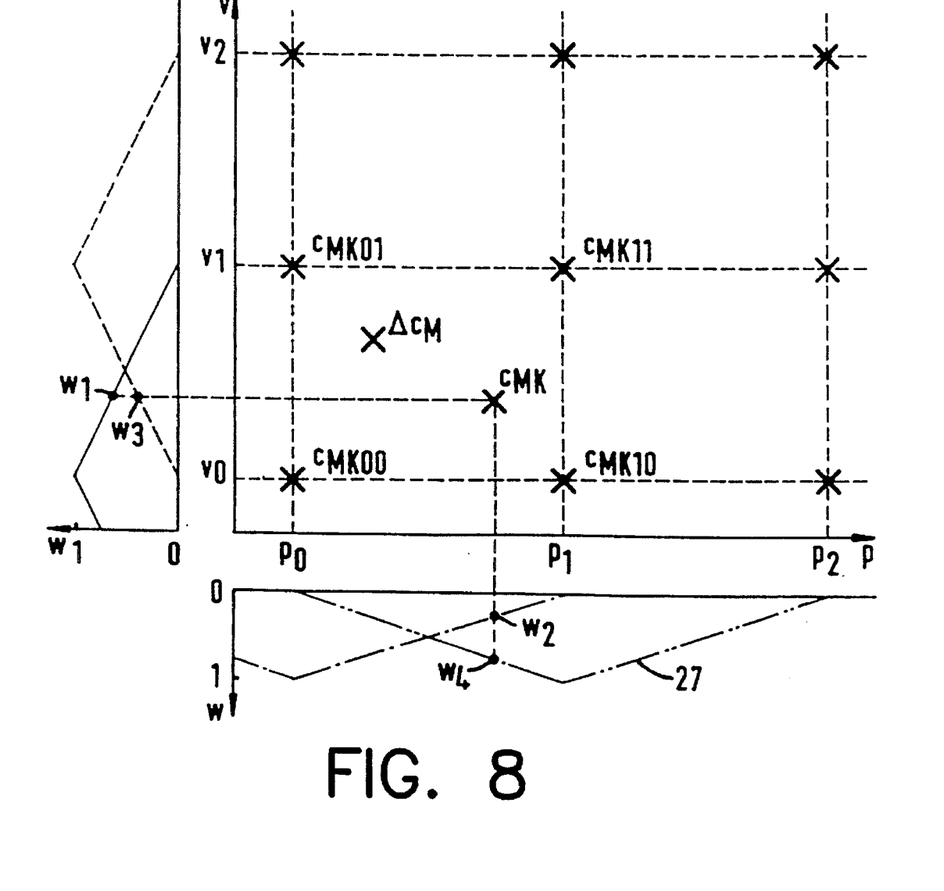
FIG. 8 is a diagram to explain the generation of a correction component by the correction device.

Finally, by interpolation between interpolation node-based correction values $c_{MKij}$ thus learned, correction component $c_{MK}$ is calculated. The interpolation takes place using fuzzy logic, with each interpolation node ($P_i$, $v_j$) being associated with a membership function 27 that weights learned correction value $c_{MKij}$ with a weight w at the interpolation node in question and in its proximity. Then membership functions 27 at corresponding interpolation nodes ($P_i$, $v_j$) have a value of 1, which decreases linearly to a value of 0 up to the respective adjacent interpolation nodes. Correction component $c_{MK}$ for input variables p and v is calculated by adding up all of the interpolation node-based correction values $c_{MKij}$ adjacent to input variables p and v and multiplied by respective weight w, with $$C_{MK}=W_1W_2C_{MK00}+W_1W_4C_{MK10}+W_2W_3C_{MK01}+W_3W_4C_{MK11}$$

Figure 9:
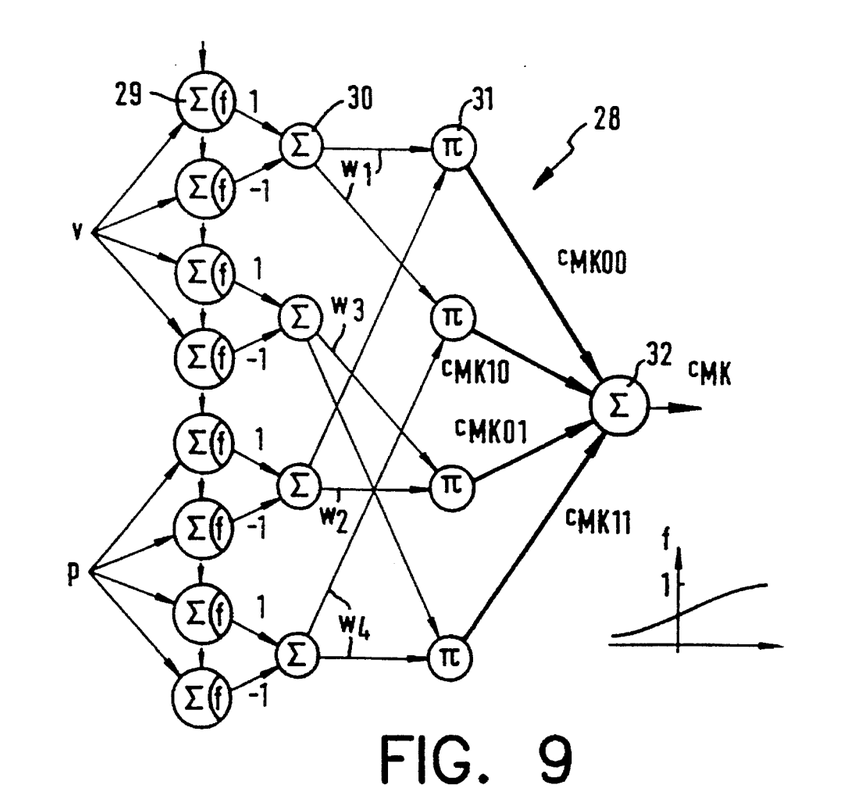
FIG. 9 is an example of the design of the correction device as a neural network.

FIG. 9 shows an example of the implementation of the calculation model given above for correction component $c_{MK}$ by a neural network 28. The latter obtains as input variables, variables v and p which are supplied to a first layer with nodes 29 with sigmoid functions. Then the triangular membership functions 27 shown in FIG. 8 are formed by two nodes 29 and subsequent addition of the node output signals in a summation node 30. The values $w_1$ to $w_4$ are linked to correction component $c_{MK}$ in accordance with the above calculation regulations by nodes 31 with product functions and a summation node 32 at the output of neural network 28. The factors $c_{MK00}$ to $c_{MK11}$ at the inputs of summation node 32 are the network parameters of neural network 28 to be learned.

What is claimed is:

1. A method for controlling a process wherein an output variable (c) that depends on a plurality of influential parameters (v, a, h, $\alpha$) acting on the process is influenced by a correcting variable (p*) acting through a correcting element on the process in such fashion that it assumes the value of a preset control variable (c*), comprising the steps of:
   a) calculating a model output value ($c_M$) using a model of the process, wherein the model output value ($c_M$) is calculated as a function of the correcting variable (p*) supplied as an input to the model and the plurality of influential variables (v, a, h, $\alpha$) and as a function of a plurality of variable model parameters (m);
   b) comparing the model output value ($c_M$) with the measured output variable (c) of the process;
   c) depending on the results of the comparison in step b), changing the plurality of model parameters (m) to reduce a difference between the model output value ($c_M$) and the output variable (c) of the process; and
   d) using the model of the process thus adapted to the actual process event to determine the correcting variable (p*) acting through the correcting element on the process as a function of the control variable (c*) and the plurality of influential variables (v, a, h, $\alpha$),
   wherein a layer thickness (c) of a strip passing through a liquid bath is regulated in the process, with air being blown from a nozzle against the strip as it emerges from the liquid bath, with a layer thickness being the output variable of the process, air pressure (p) representing the controlling variable, and strip speed (v) as well as the geometric arrangement of the nozzle relative to the strip being the influential parameters acting on the process.

2. The method according to claim 1, wherein step d) of using the model of the process thus adapted to the actual process event to determine the correcting variable (p*) further comprises supplying control variable (c*) and the plurality of influential variables (v, a, h, $\alpha$) to an input of an inverse model of the process which generates correcting variable (p*) as an output, and further comprising the step of adapting the inverse model to the process event depending on the adaptation of the model of the process.

3. The method according to claim 1, wherein step d) of using the model of the process thus adapted to the actual process event to determine the correcting variable (p*) further comprises the steps of:
   e) comparing the control variable (c*) with the model output value ($c_M$);
   f) depending on the results of the comparison in step e), changing a value for the correcting variable (p*) supplied to the model until the model output value ($c_M$) corresponds to the control variable (c*); and
   g) supplying the value finally obtained for the correcting variable (p*) to the correcting element.

4. The method according to claim 1, further comprising the steps of:
   f) supplying a regulation difference ($\Delta c$) between the model output value ($c_M$) or the control variable (c*) given previously and the measured output variable (c) of the process to a regulating device, whose output signal ($\Delta p$) is switched to the controlling variable (p*) generated by means of the model of the process.

5. The method according to claim 4, further comprising the step of:
   g) adjusting the amplification of the regulating device by means of the model output value ($c_M$) supplied by the model of the process.

6. The method according to claim 1, further comprising the step of:

f) forming the model output value ($c_M$) by linking a basic component ($c_{MF}$) and a correction component ($c_{MK}$);

g) generating the basic component ($c_{MF}$) by a basic model of the process, which is prepared based on existing knowledge about the process and which is adapted to the process event using the measured output variable (c) of the process; and h) generating the correction component ($c_{MK}$) by a correction device which is adjusted adaptively to the process event depending on a difference still existing between the model output value ($c_M$) and output variable (c) of the process following adaptation of the basic model.

7. The method according to claim 6, further comprising the step of:

i) preparing a mathematical function to produce the basic model of the process based on existing knowledge about the process, wherein said function shows a dependence of the output variable (c) of the process on the correcting variable (p*), on the plurality of influential variables (v, a, h, $\alpha$), and on the functional parameters (K1, K2, K3), and the function thus obtained is in the form of a neural network, to which correcting variable (p*) and influential parameters (v, a, h, $\alpha$) are supplied on the input side, and whose parameters (K1, K2, K3) corresponding to the functional parameters are adjusted adaptively to the process event.

8. The method according to claim 7, further comprising the steps of:

j) generating interpolation node-based correction values ($c_{MKij}$) by the correction device for preset interpolation nodes ($p_i$, $v_j$) in a multidimensional space defined by the correcting variable (p*) and the plurality of influential variables (v, a, h, $\alpha$);

k) calculating the interpolation node-based correction value ($c_{MKij}$) in such fashion from differences between the model output value ($c_M$) and the output variable (c) of the process which is measured together with the values of the correcting variable (p*) and the plurality of influential variables (v, a, h, $\alpha$) located between interpolation nodes ($p_i$, $v_j$);

l) determining the respective difference $\Delta c_M$ upon interpolation of the interpolation node-based correction values ($c_{MKij}$); and m) calculating the correction component ($c_{MK}$) by interpolation between said interpolation node-based correction values ($c_{MKij}$) to whose interpolation nodes ($p_i$, $v_j$) values for the correcting variable associated with correction component ($c_{MK}$) and the plurality of influential variables (v, a, h, $\alpha$) are adjacent.

9. The method according to claim 8, wherein said step m) of calculating further comprises calculating the interpolation of the correction component ($c_{MK}$) using fuzzy logic, wherein a membership function is assigned to each interpolation node ($p_i$, $v_j$), said function having the value of one at the interpolation node ($p_i$, $v_j$) in question, and dropping to the value of zero by the next interpolation node, and the interpolation node-based correction values ($c_{MKij}$) are weighted with the corresponding membership functions and superimposed on one another.

10. The method according to claim 9, wherein the correcting component ($c_{MK}$) is calculated in a neural network that forms the correction device.

11. (Amended) The method according to claim 1, wherein the strip and the liquid bath comprise zinc.

* * * * *